(12) United States Patent
Dabbs, III et al.

(10) Patent No.: US 8,588,207 B2
(45) Date of Patent: Nov. 19, 2013

(54) METHOD AND APPARATUS FOR EFFICIENT AND DETERMINISTIC GROUP ALERTING

(75) Inventors: James M. Dabbs, III, Stockbridge, GA (US); Brian Claise, Alpharetta, GA (US)

(73) Assignee: Critical Holdings, Inc., Norcross, GA (US)

( * ) Notice: Subject to any disclaimer, the term of this patent is extended or adjusted under 35 U.S.C. 154(b) by 0 days.

(21) Appl. No.: 13/476,641

(22) Filed: May 21, 2012

(65) Prior Publication Data

US 2012/0327781 A1    Dec. 27, 2012

Related U.S. Application Data

(63) Continuation of application No. 13/154,138, filed on Jun. 6, 2011, now Pat. No. 8,199,740, which is a continuation of application No. 11/303,025, filed on Dec. 16, 2005, now Pat. No. 7,969,959.

(60) Provisional application No. 60/636,094, filed on Dec. 16, 2004.

(51) Int. Cl.
*H04W 24/00* (2009.01)

(52) U.S. Cl.
USPC .......................................... 370/349; 455/410

(58) Field of Classification Search
USPC ............... 455/404.1, 410; 370/310, 349, 390, 370/442, 445, 539.1
See application file for complete search history.

(56) References Cited

U.S. PATENT DOCUMENTS

| | | | |
|---|---|---|---|
| 5,278,539 A | 1/1994 | Lauterbach et al. | |
| 5,835,860 A | 11/1998 | Diachina | |
| 6,304,649 B1 | 10/2001 | Lauzon et al. | |
| 6,529,735 B1 | 3/2003 | De Brito | |
| 6,710,702 B1 | 3/2004 | Averbuch et al. | |
| 6,714,636 B1 | 3/2004 | Baiyor et al. | |
| 6,804,332 B1 | 10/2004 | Miner et al. | |
| 7,337,146 B2 | 2/2008 | Heelan et al. | |
| 7,657,253 B2 | 2/2010 | Lewis | |
| 7,808,378 B2 | 10/2010 | Hayden | |
| 2001/0010490 A1 | 8/2001 | Bellin | |
| 2002/0177428 A1 | 11/2002 | Menard et al. | |
| 2003/0153343 A1 | 8/2003 | Crockett et al. | |
| 2004/0087300 A1 | 5/2004 | Lewis | |
| 2004/0180654 A1 | 9/2004 | Chen | |

(Continued)

OTHER PUBLICATIONS

M 1520, Product Brochure, Critical Response Systems™, Copyright 2005, 2 pages, www.critresp.com.

(Continued)

*Primary Examiner* — Sam Bhattacharya
(74) *Attorney, Agent, or Firm* — Roylance, Abrams, Berdo & Goodman, LLP

(57) ABSTRACT

Systems and methods are provided for reliable, wireless group alerting in a system having a database, switch, wireless network, and a plurality of intelligent mobile receivers, and preferably employing a modified two-way paging based on ReFLEX™ protocol information service (IS) messages and a novel ALOHA command for multicast acknowledgement from mobile receivers. An encrypted message is broadcast to and received by a selected number of the mobile receivers. The network replies to the sender with detailed information about the individual members in the alert group. Each of the mobile receivers in the group then acknowledges the common message back to the system, decrypts the message, displays it to the user, and allows the user to respond. The system employs centralized management to simplify the roles of the mobile users and administrators, minimizing configuration and operational human errors that would otherwise result in confusion or lost messages.

13 Claims, 7 Drawing Sheets

(56) References Cited

U.S. PATENT DOCUMENTS

| | | |
|---|---|---|
| 2005/0157720 A1 | 7/2005 | Chandhok et al. |
| 2005/0198183 A1 | 9/2005 | Zilliacus et al. |
| 2006/0105740 A1 | 5/2006 | Puranik |
| 2006/0178128 A1 | 8/2006 | Eaton et al. |
| 2006/0273893 A1 | 12/2006 | Warner |
| 2010/0146057 A1 | 6/2010 | Abu-Hakima et al. |

OTHER PUBLICATIONS

M 1501, Product Brochure, Critical Response Systems™, Copyright 2005, 3 pages, www.critresp.com.

"Mobile Data and Paging for First Responders", Sparkgap™. Copyright 2004, 2 pages, www.tga.com.

ent application Ser. No. 13/154,138, filed Jun. 6, 2011, now U.S.
METHOD AND APPARATUS FOR EFFICIENT AND DETERMINISTIC GROUP ALERTING This patent application is a continuation of U.S. patent application Ser. No. 13/154,138, filed Jun. 6, 2011, now U.S. Pat. No. 8,199,740, which is a continuation of U.S. patent application Ser. No. 11/303,025, filed Dec. 16, 2005 now issued as U.S. Pat. No. 7,969,959, which claims the benefit of U.S. provisional application Ser. No. 60/636,094, filed Dec. 16, 2004, the entire disclosures of which are incorporated herein by reference.

BACKGROUND OF THE INVENTION

The ability to alert and mobilize first responders is central to the readiness of any public safety agency. In the aftermath of recent major public safety events, including natural and man-made disasters, the public safety community has thoroughly examined all aspects of wireless interoperable voice communications. However, first responder alerting has remained largely unexamined for over a decade, and in communities relying on volunteer first responders, the critical importance of first responder alerting rivals that of interoperable voice communications.

Shortcomings with current alerting technologies are well documented in the public record. One analysis of communication failure during periods of profound crisis, the *Arlington County After-Action Report on the Response to the September 11 Terrorist attack on the Pentagon* available from Arlington County, Virginia, notes failures in all forms of communications, from initial alerting to tactical voice communication. As stated in this report, during the events of Sep. 11, 2001, radio channels became oversaturated, and interoperability problems among jurisdictions and agencies persisted throughout the entire response process. Otherwise compatible portable radios were preprogrammed in a manner that precluded interoperability. Cellular telephone systems and even the public switched telephone network (PSTN) became congested and unusable.

This report cited traditional, 1-way paging systems as the most reliable method of alerting and notification. However, the lack of a paging response channel left responders relying on other, less reliable forms of communication to escalate, reply to, or even confirm receipt of their instructions. These problems with cellular telephone networks and the PSTN limited the overall effectiveness of 1-way paging as an alerting system. This created serious operational challenges during the Sep. 11, 2001 series of events, and they will create similar problems in any such future events.

Even during day-to-day public safety activity, these alerting system limitations are problematic. In most cases, when volunteer groups are alerted by pager, incident commanders do not know who will actually respond until personnel begin to arrive on scene. This delay postpones decisions regarding escalation and mutual aid, letting critical time slip by before commanders can identify and correct problems with the response. This time period can define the success or failure of the response process, presenting a critical need for simple, inexpensive, pager-type devices that can reply to group messages.

However, public safety agencies still rely on 25-year old, 1-way paging technology as their core alerting solution. Many newer technologies are available, but for alerting, for a variety of reasons, these technologies do not provide a meaningful improvement over 1-way paging. Existing mobile data systems are too expensive and too bulky for continual personal use. Digital and analog 2-way voice systems are similarly impractical for widespread, continuous deployment to volunteer forces. Several contemporary PCS technologies have integrated voice, data, and paging, but their complete dependence on commercial networks runs counter to commonly accepted reliability standards (e.g., NFPA-1221). Private broadband solutions (such as IEEE 802.11 and 802.16) provide high-capacity data capabilities, but they lack the coverage, portability, and resilience required for wide-area alerting of large volunteer forces. Contemporary 2-way paging systems perhaps come closest to meeting the alerting needs of public safety agencies. Like 1-way systems, these pagers are small, inexpensive devices that operate for long periods on battery power. However, these systems have no ability to acknowledge group messages.

More importantly, beyond the limitations described above, none of these systems provide a network interface sufficient to support acknowledged group messaging. Requiring that the message originator individually alert each recipient adds considerable setup delay when alerting large groups. This delay is eliminated when using network-supported call group or common address messages, but the message originator must have prior knowledge of group membership. If a message originator does not know the membership of the paged group, there is no context to know whether enough manpower is responding, or whether key individuals have been mobilized. Manually maintaining accurate group membership rosters between networks and message originators would be impractical since this is time consuming, difficult, and prone to errors. For a communications system to provide usable, acknowledged group alerting capabilities to public safety agencies, the network interface must provide group membership details when the group message is sent. Even if the mobile devices were capable of acknowledging group messages, current systems do not provide message originators this membership information regarding the alerted group. Simply guaranteeing that a message will be eventually delivered to all recipients is insufficient for public safety alerting applications. The message originator (dispatcher, incident commander, etc.) needs immediate feedback as to who has been alerted and how they have replied, as well as information concerning those who cannot be reached.

A need therefore exists for a 2-way paging system that could be improved with group message acknowledgement and a suitable system interface. Such a system would address the current shortcomings of public safety alerting systems, and could also provide other benefits. For instance, it could act as an improved personnel accountability system (PAS) for on-scene communications. Incident commanders could instantly notify responders of imminent threats, such as impending chemical release or structure failure, and verify receipt by all personnel. Responses could be expanded to include location information and health or equipment status information. Such systems, made practical because of the high performance and low cost of 2-way pagers, would both obviate traditional problems with interoperable on-scene communications and enable central oversight of critical real-time safety data.

While public safety's need for a system capable of acknowledged group alerting system is clear and well documented in the public record, no such system yet exists but for the present invention described herein.

SUMMARY OF THE INVENTION

The above-described deficiencies in the prior art are overcome and a number of advantages are realized by the present invention. In accordance with an aspect of the present invention, a method of efficient and deterministic alerting of a group of recipients over a wireless network is provided. Each recipient comprises at least one mobile device capable of transmitting and receiving data. The method comprises the steps of: storing data relating to recipients, groups and group members, in a memory device, the data comprising a recipient identifier for each of a plurality of recipients, one or more group identifiers corresponding to each of respective groups of recipients, the groups each comprising selected ones of the plurality of recipients, and group membership data comprising the recipient identifiers of the selected recipients corresponding to each of the group identifiers; providing the mobile device corresponding to each of the plurality of recipients with at least a subset of the data stored in the memory device, the subset of the data being stored in the mobile device and comprising its corresponding recipient identifier and the group identifier of each group to which that recipient belongs as a group member; wirelessly broadcasting a group message addressed with a selected one of the group identifiers, each of the mobile devices being configured to receive the broadcast group message, to analyze a group identifier provided with the group message, and send a response when the group identifier in the group message is determined to be for a group to which that mobile device belongs; monitoring for responses to the group message from the group members of the group identified by a group identifier provided in the group message; and storing acknowledgement data in the memory device for each of the group members, the acknowledgement data comprising a listing of each of the group members and an indication of response for each of the group members, the indication of response comprising at least one of an indication of no response when that group member has not yet responded to the group message, and an indication of response when a response sent by the mobile device of that group member has been received.

BRIEF DESCRIPTION OF THE DRAWINGS

The present invention can be further understood with reference to the following description and the appended drawings, wherein like elements are provided with the same reference numerals.

DETAILED DESCRIPTION OF THE EXEMPLARY EMBODIMENTS

Overview

Figure 1:
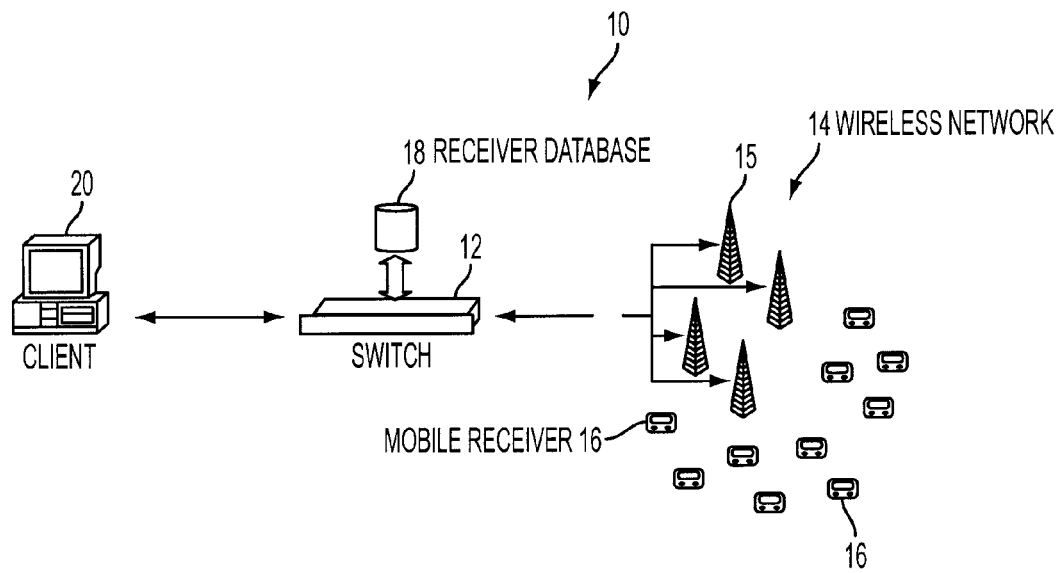
FIG. 1 is a diagram of a group alerting system constructed in accordance with an exemplary embodiment of the present invention.

In accordance with the present invention, a system and method are provided for reliable, wireless group alerting in a system that comprises a database, switch, wireless network, and a plurality of intelligent mobile receivers, and employs a modified two-way paging protocol based on group messaging capability of the Motorola ReFLEX™ protocol and a novel ALOHA command for multicast acknowledgement (ACK) from mobile receivers. An encrypted message is broadcast to a group address. This message is received by a number of mobile receivers, each of which then acknowledges back to the system, decrypts the message, displays it to the user, and allows the user to respond, if they belong to the group address. The system employs centralized management to simplify the role of the mobile users and administrators, minimizing configuration and operational human errors that would otherwise result in confusion or lost messages. It also employs novel mechanisms to compress the responses from the receivers to use minimal airtime. The system is particularly relevant to public safety and critical infrastructure operators, where large group dispatches must be delivered quickly and deterministically to a heavily distracted mobile workforce, and their responses must be delivered to the dispatch center efficiently. As such, this system provides a comprehensive, meaningful solution to support distracted users with simple, resilient group messaging. It is to be understood that, while an exemplary embodiment is described herein that uses paging technology, the present invention can also be implemented using a cellular system, a wireless local area network or more specifically WiFi, or other wireless communication technology.

In accordance with an exemplary embodiment of the present invention, a system for group alerting employs a SPARKGAP™ network which utilizes a modified version of a protocol called ReFLEX™ developed by Motorola, Inc. for two-way paging and Narrowband PCS (NPCS). This system uses a 12.5 KHz channel pair operating in the 900 MHz band. It is to be understood, however, that the group messaging of the present invention can be implemented using other types of protocols and network devices.

In accordance with an aspect of the present invention, a SPARKGAP™ Dispatch Protocol (SDP) is provided as a streamlined means for a computer aided dispatch (CAD) system to communicate with two-way pagers on a SPARKGAP™ ReFLEX™ network. SPARKGAP™ is a ReFLEX™ network solution designed to control one or more base stations and provide two-way paging and mobile data coverage over an arbitrary geographical area. While this solution is similar in some ways to traditional one-way paging, two-way paging also differs significantly from its one-way counterpart. Two-way pagers acknowledge and reply to messages they receive, and they can originate their own messages. These additional capabilities outperform traditional paging input protocols (e.g., SNPP, TAP and TNPP). In addition, while more suitable second generation paging protocols exist (e.g., SMTP, SMPP, and WCTP), these newer protocols do not expose group membership information necessary for effective, acknowledged group messaging.

The SDP of the present invention is a transactional, TCP/IP protocol where the CAD system is the client and the SPARK-GAP™ is the server. It features synchronous, client-initiated request/response transactions as well as asynchronous server-driven events, minimizing latency and complexity and delivering a rational solution to the public safety space.

A Dispatch/Response Layer (DRL) is also provided in accordance with the present invention as a layer above the ReFLEX™ Air Protocol to support group messaging. The SDP and DRL are analogized as book ends in that they operate on either side of the ReFLEX™ network.

ReFLEX™ supports personal and information service (IS) messages. Personal messages involve a single recipient, and ReFLEX™ enables the receiving pager to acknowledge reception, notify that the user has read the message, and relay multiple-choice responses from the user. IS messages involve an arbitrary group of recipients sharing common group addresses called IS addresses. ReFLEX pagers can be configured with one personal address and multiple IS addresses. IS messages are strictly one-way and ReFLEX™ does not support any response or acknowledgement from the recipient group. The present invention, however, adds message acknowledgement, message read notification, and multiple-choice response capability to IS messages, creating an infrastructure for reliable multicast messaging within the ReFLEX™ protocol. As described further below, the present invention implements two significant changes to conventional 2-way paging. First, it defines a new ALOHA command ('Multicast ACK Command') used by a pager to reply to an IS message. Second, it defines a flag to select which devices are allowed to use this feature.

System Description

A system 10 configured in accordance with an exemplary embodiment of the present invention is depicted in FIG. 1. With reference to FIG. 1, a central switching system (hereinafter referred to generally as 'Switch') 12 connects to a Wireless Network 14 and communicates with a number of subscriber devices (hereinafter referred to generally as 'Receivers') 16 such as pagers, cell phones, or wireless personal data assistants (PDAs), or portable computer running WiFi. Each Receiver is assigned one identifying Primary Address and one or more multiple Group Addresses, and is capable of receiving broadcast alert messages directed to any of its addresses. The Switch 12 comprises a Receiver Database 18 comprising stored information describing receivers, their group membership, and connects to a Wireless Network 14 such as a PCS network employing cell broadcast, a paging network, or a broadcast-capable data network employing group addressing.

Figure 2:
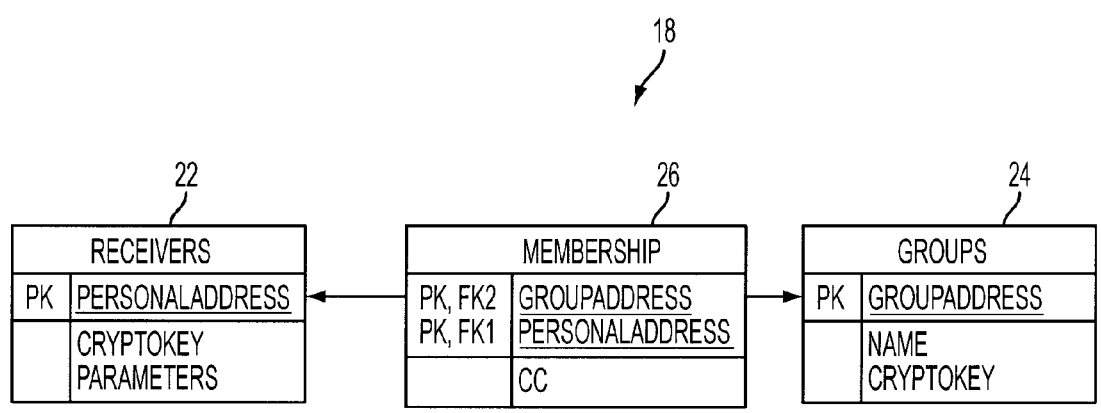
FIG. 2 is a diagram of a database used in a group alerting system constructed in accordance with an exemplary embodiment of the present invention.

With reference to FIG. 2, the Receiver Database 18 comprises an independent table of Receivers 22 and an independent table of Groups 24. Each Receiver row in table 22 contains an identifying personal address, as well as other information specific to a single device 16 and its Wireless Network architecture. Each Group row in table 24 contains an identifying group address, an encryption key, and a symbolic name. A dependent table of Membership 26 provides the many-to-many relationship between Receiver and Group rows. Each Membership row assigns one receiver to one group. Membership rows contain GroupAddress and PersonalAddress columns, identifying a Group and Receiver row, respectively. Each Membership row also contains a ReceiverGroupNumber column, a small mnemonic value that uniquely identifies the Group from other Groups programmed into the same Receiver, and CC ('carbon copy') flag to define specific behavioral aspects of the Receiver. Receivers do not respond to messages received by group addresses if their CC flag is set, while they can respond to messages received by group addresses if their CC flag is clear. This mechanism allows users to monitor alerts to specific groups, without expectation by the source of the alerts for a response.

As administrative changes occur to the Receiver Database 18, configuration transactions are executed over the air with individual Receivers 16 to synchronize their configuration memory with the corresponding data in the Receiver Database 18. The system 10 therefore maintains an up-to-date image in the configuration memory of each Receiver 16, including a list of Group addresses, their ReceiverGroupNumber values, their symbolic names, encryption keys, and CC flags.

Figure 7:
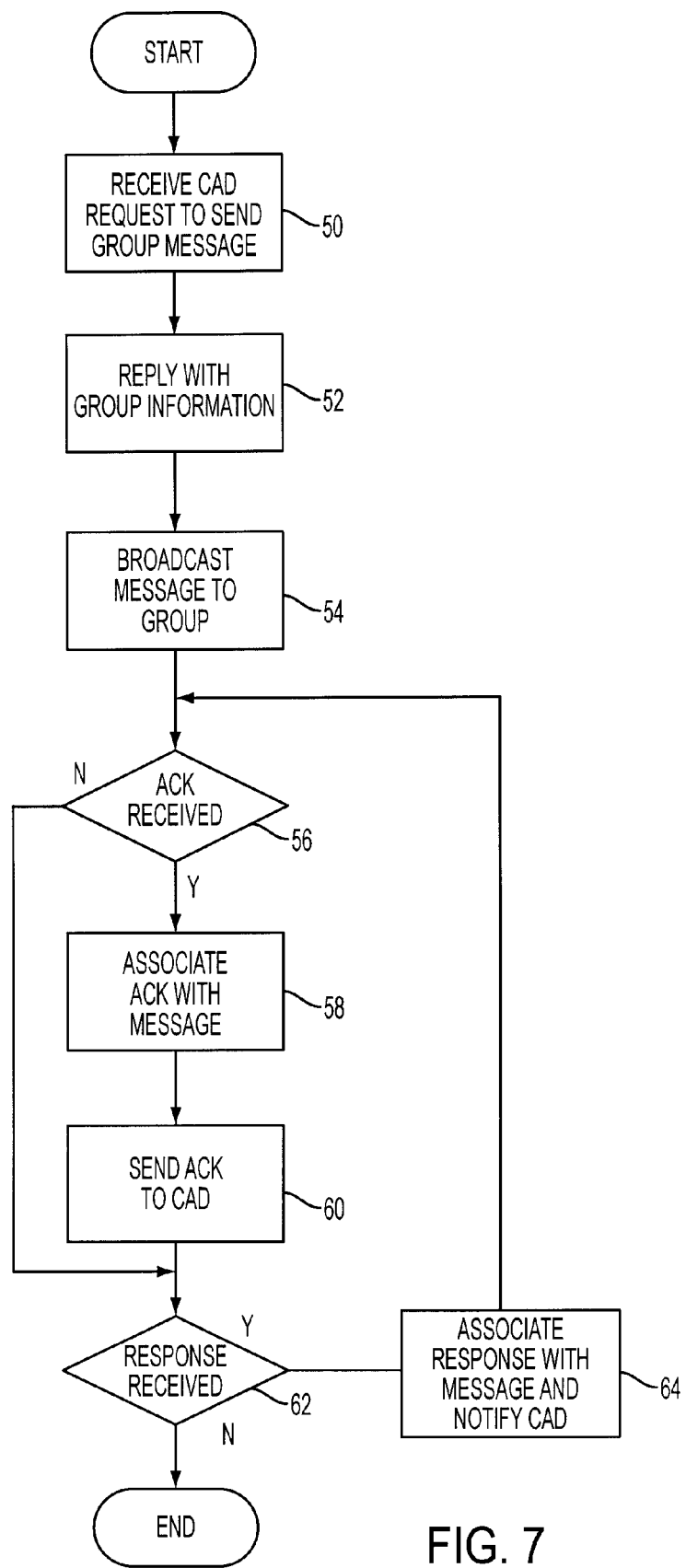
FIG. 7 is a flow chart illustrating a sequence of operations for broadcasting a group message and group message acknowledgment in accordance with an exemplary embodiment of the present invention.
Figure 8:
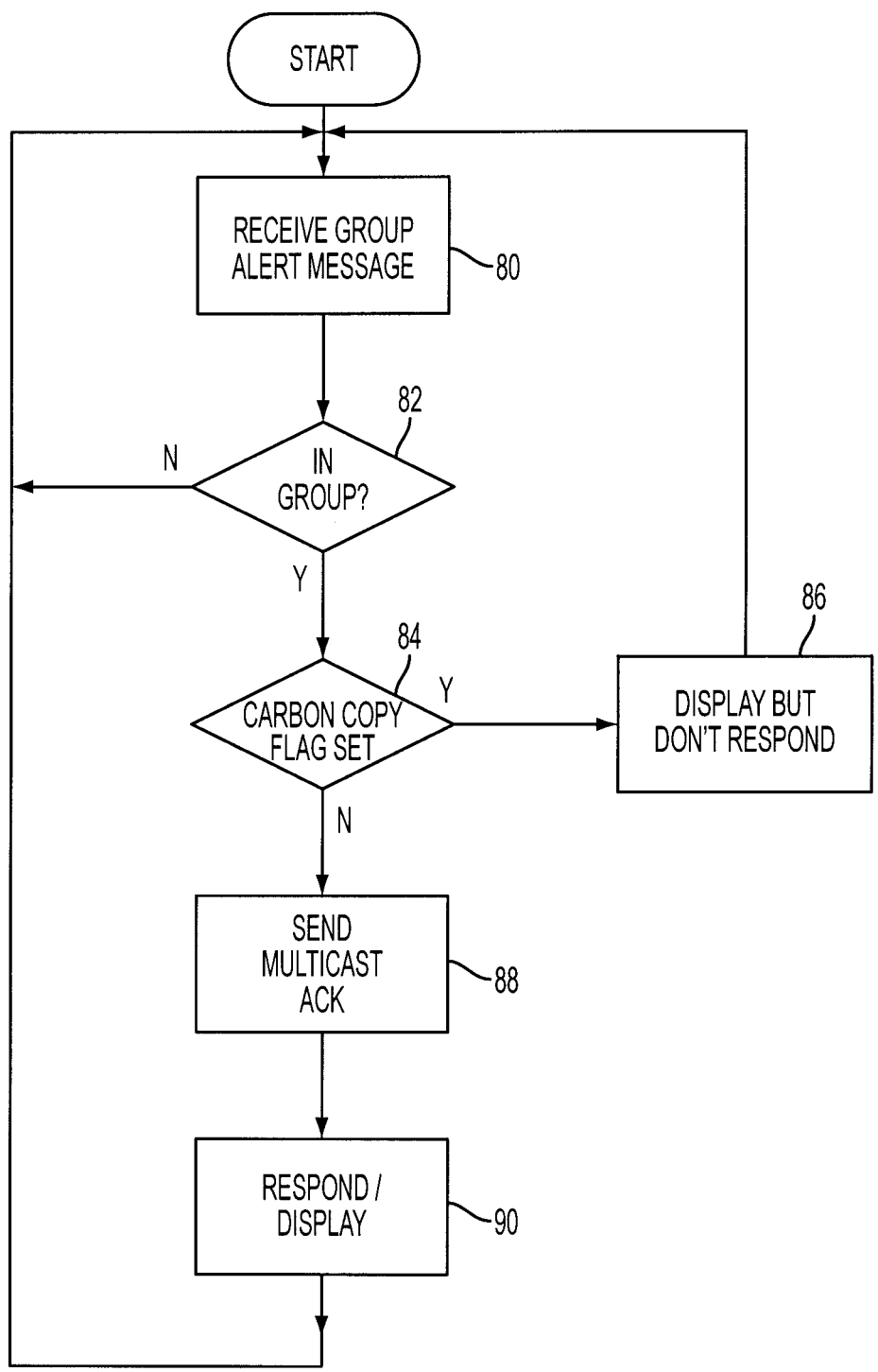
FIG. 8 is a flow chart illustrating a sequence of operations for receiving, acknowledging and processing group message at a mobile receiver in accordance with an exemplary embodiment of the present invention.

With reference to the flow charts in FIGS. 7 and 8, a 'Client' (e.g., a computer-aided dispatch center, a human user, or other network client 20) uses this system 10 to broadcast alert messages to groups of Receivers 16. To do so, the client 20 composes a message, preferably including display content and a list of response strings. The Client 20 then connects to the Switch 12 and requests transmission of the message to a particular group name (block 50). Depending on the architecture of the Wireless Network 14, either the Client 20 or the Wireless Network 14 assigns an identifying field to the message such that user responses can be associated with the correct message.

Upon receipt of the message, the Switch 12 responds to the Client 20 with detailed information on the group such as a list or a count of group members (block 52). It then encrypts the Group Message, assigns a cyclical message sequence number, and transmits the message to the Group Address (block 54). As described in more detail below in connection with the SPARKGAP™ dispatch protocol (SDP), the Switch 12 receives group message acknowledgment responses from the receivers 16 (block 56) that are associated with the broadcast group message (block 58) and provided to the Client 20 (block 60). Similarly, other types of responses generated as a result of the group message are associated with the broadcast group message (block 62) and provided to the Client 20 (block 64).

Upon receiving the Group Message (block 80), the Receivers 16 decrypt the message and display the content, group name, and multiple choice options to the user. Receivers employing paging technology that are not addressed in the group do not receive the message. Alternatively, a system 10 employing cellular broadcast of the message can receive but ignore the message if it is not in the addressed group (block 82). Each Receiver 16 with a CC flag of false transmits one or more acknowledgement codes through the Network 14 back to the Switch 12, specifying message received, message read notifications, and enumerated multiple-choice responses (block 84, 88 and 90). The datagram carrying the acknowledgement code also includes the personal address of the receiver 16, the ReceiverGroupNumber of the group address, and the message sequence number of the message, which together efficiently and uniquely identify the specific group message at the specific Receiver 16. Each Receiver 16 in the group with a CC flag of true does not transmit an acknowledgment reply to the Switch 12 but rather merely displays the group message (blocks 84 and 86).

Each receiver 16 provides a configuration display for the user. This display allows the user to specify, by group name, how notification should occur for messages received by each group address. Similarly, the Switch provides an administrative human interface that allows a system administrator to set up and maintain the Receivers 16 belonging to each Group.

An Exemplary Computer Aided Dispatch (CAD) System

Figure 3:
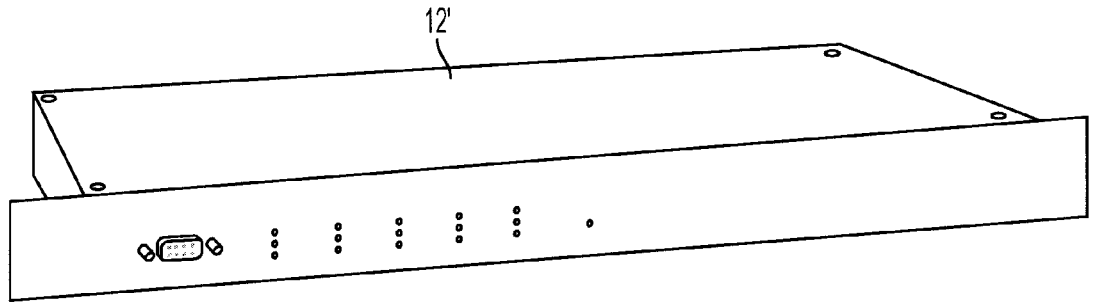
FIG. 3 is an isometric view of a switch or server used in a group alerting system constructed in accordance with an exemplary embodiment of the present invention.
Figure 4:
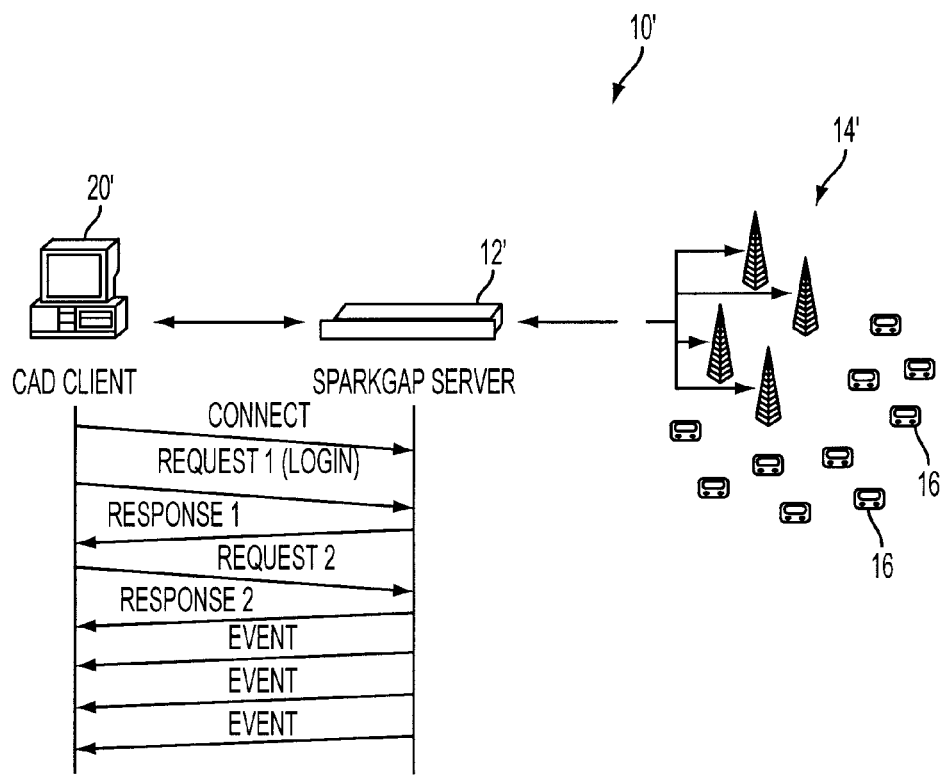
FIG. 4 is a diagram of communication between a client and a server used in a group alerting system constructed in accordance with an exemplary embodiment of the present invention.
Figure 5:
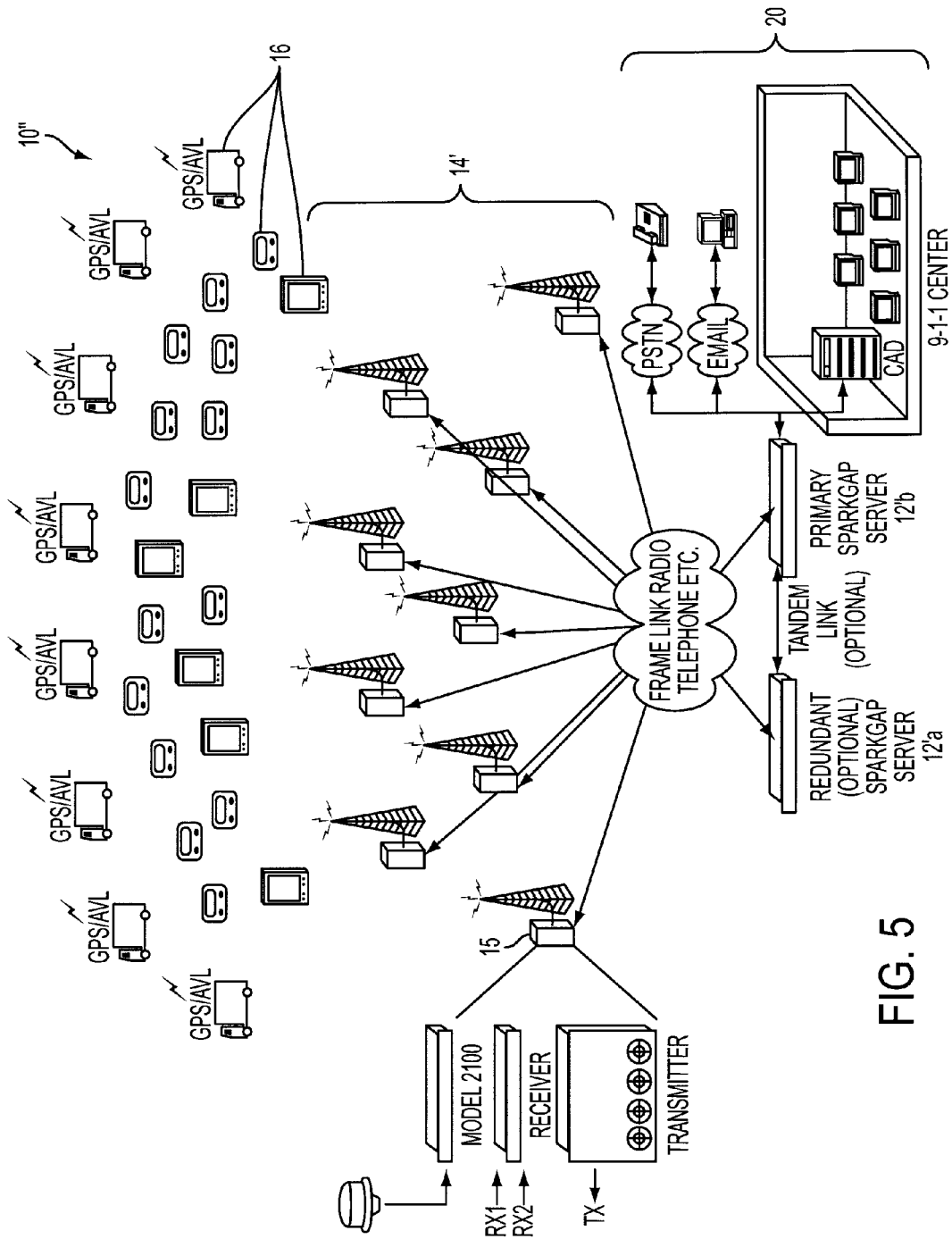
FIG. 5 is a diagram of a group alerting system constructed in accordance with an exemplary embodiment of the present invention.

The foregoing system description discusses the high-level organization and data flow of an exemplary group messaging system 10 that can use any of a variety of network types. With reference to FIGS. 3, 4 and 5, the following is a description of an exemplary type of network, that is, a ReFLEX™ two-way paging network that incorporates the new group messaging layer of the present invention. FIG. 3 is a SPARKGAP™ network controller 12' which is configured to implement group messaging in accordance with an exemplary embodiment of the present invention. FIG. 4 illustrates the use of a SPARKGAP™ network controller or server 12' in a system configuration 10' similar to FIG. 1. FIG. 5 illustrates another system configuration 10" in accordance with another exemplary embodiment of the present invention.

The SPARKGAP™ network controller or server 12' in FIG. 3 provides private two-way paging, mobile data, and wireless email over inexpensive channel pairs in the 900 MHz Enhanced Specialized Mobile Radio (ESMR) band or the Narrowband Personal Communication Services (N-PCS) band. Coverage can be configured for a single building, multiple counties, or state-wide service, for example, supporting small user devices such as pagers and personal data assistants (PDAs) with Motorola's proprietary ReFLEX™ protocol. Since the SPARKGAP™ server provides encrypted acknowledgement paging, responders reply immediately to CAD events and other messages directly from their pagers, and Advanced Encryption Standard (AES) encryption protects all transmissions. Since the SPARKGAP™ server 12' supports mobile applications, law enforcement officers can use PDAs as receivers 16 to connect wirelessly with municipal, state, and federal databases to run license checks, warrants, and other mobile applications. Further, the SPARKGAP™ server is useful for automatic vehicle location. Small, inexpensive GPS sending units can be used as receivers 16 to monitor vehicles and heavy equipment, sending real-time location and status information on a 24 hour per day, 7 day per week basis. The SPARKGAP™ server 12' can also support wireless e-mail. Users can send and receive secure, wireless email using pagers and PDAs.

The SPARKGAP™ server 12' can support one base station 15 or hundreds of base stations 15 in a network 14', each consisting of a standard 900 MHz paging transmitter and ReFLEX™ base receiver as shown in FIG. 5. A single station covers a 7-20 mile radius, and a network 14' can coordinate multiple stations using simulcast or cellular arrangements to optimize coverage and capacity. A single channel pair can serve thousands of users, and multiple channels can be aggregated for additional capacity. Even under worst-case peak conditions, the ReFLEX™ protocol uses centralized arbitration to prevent contention and channel overloading.

In accordance with an exemplary embodiment of the present invention, the SPARKGAP™ server 12' maintains a full packet data layer on top of paging, which is one of the most robust and most reliable communication technologies available, and leverages this foundation into a balanced set of features, coverage, and capacity. The SPARKGAP™ server 12 'connects directly to computer-aided dispatch (CAD) systems, provides low latency messaging with virtually unbreakable security, and operates with the lowest cost-per-user and cost-per-coverage-area of any wireless data solution available. For additional resilience, redundant hot standby units maintain network operation even under catastrophic circumstances, keeping first responders connected when they are needed most.

As stated previously, the SPARKGAP™ protocol and associated server 12' provide a ReFLEX™ network solution designed to control one or more base stations 15 and provide two-way paging and mobile data coverage with user devices 16 over an arbitrary geographical area. While this solution is similar in some ways to traditional one-way paging, two-way paging also differs significantly from its one-way counterpart. Two-way pagers acknowledge and reply to messages they receive, and they can originate their own messages. These additional capabilities outperform traditional paging input protocols (e.g., SNPP, TAP and TNPP). In addition, while more suitable second generation paging protocols exist (e.g., SMTP, SMPP, and WCTP), these newer protocols do not expose group membership information necessary for effective, acknowledged group messaging.

Client 20/Server 12 Protocol

Figure 6:
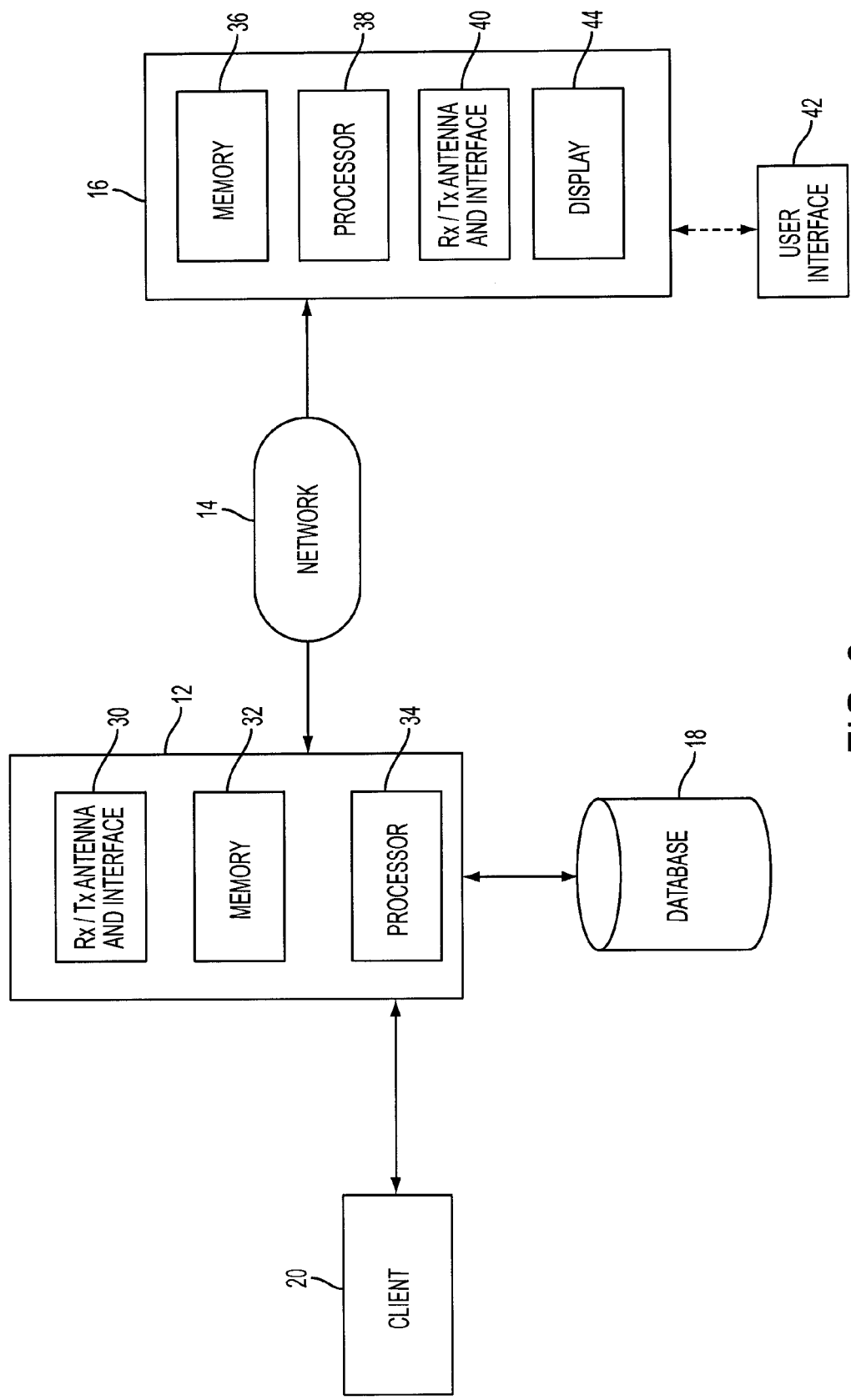
FIG. 6 is a block diagram of a group alerting system constructed in accordance with an exemplary embodiment of the present invention.

In accordance with an aspect of the present invention, a SPARKGAP™ Dispatch Protocol (SDP) is provided as a streamlined means for a computer aided dispatch (CAD) system 20' to communicate with two-way pagers 16 in, for example, a SPARKGAP™ ReFLEX™ network 14'. It is to be understood, however, that the group messaging of the present invention can be implemented using other types of protocols and network devices. The SDP of the present invention is a transactional, TCP/IP protocol where the CAD system is the client 20' and the SPARKGAP™ network controller 12' is the server. It features synchronous, client-initiated request/response transactions, as well as asynchronous server-driven events, to minimize latency and complexity and deliver a rational solution to the afore-mentioned issues relating to public safety and rapid response and communication. With reference to FIG. 6, the server or switch 12 or 12' comprises a memory device 32 and processor 34, which can be programmed to implement the SDP, as well as an interface 30 to the network 14 or 14'.

With further reference to FIG. 4, when employing SDP, the CAD system or client 20' connects to the SPARKGAP™ server 12' using TCP/IP on port 55000. The CAD system or client 20' initiates transactions with the SPARKGAP™ server 12' using a synchronous request/response model, that is, the CAD system 10' sends the SPARKGAP™ server 12' a request from a client 20', the SPARKGAP™ sever 12' takes an action, and then the SPARKGAP™ server 12' sends the CAD system client 20' a response. Additionally, in order to minimize latency in delivering responses from the pagers, the SPARKGAP™ server 12' also sends asynchronous event notifications to the CAD system client 20' regarding message progress and responses from individual pagers.

The SDP will now be described in further detail. A description of protocol data units, transactions and events follows.

1. SDP Protocol Data Units

SDP requests, responses, and events are implemented as atomic protocol data units (PDUs) transmitted by the client 20 or 20' and server 12 or 12' using preferably a TCP/IP network. PDUs are serialized, and preferably always transmitted contiguously in their entirety. In other words, a node preferably never interrupts a partially transmitted PDU to begin another PDU. A PDU is preferably encoded using ASCII plain text, and consists of an identifying header followed by a collection of name/value attributes enclosed, as shown below, in curly brackets (braces).

1.1 Syntax

PDUs are preferably encoded using ASCII plain text according to the following specification:

```
Client-to-server transmission syntax:
  "request" <request-number> <request-type> "{" <attribute-list> "}"
Server-to-client transmission syntax:
  "event" <event-type> "{" <attribute-list> "}"
  "response" <request-number> "{" attribute-list "}"
where,
<request-number>    ::= <integer>
<request-type>      ::= token
<event-type>        ::= token
<attribute-list>    ::= <attribute> [<attribute-list I
<attribute>         ::= attribute-name "" attribute-value ";"
<attribute-name>    ::= token
<attribute-value>   ::= <integer> <string>
<integer>           ::= Base10 Integer Expression
<string>            ::= string enclosed in double quotes
```

An example PDU exchange is illustrated as follows:

```
CAD to SPARKGAP ™              SPARKGAP ™ to CAD request 5066 SendMessage
{
CadEventID="#CTYF041820772";
MessageID="2004";
DestinationID=Fire1;
Display="Calling All Cars";
AlertResponse=0;
ReadResponse=1;
MCR="On My Way";
MCR="Busy";
MCR="On Scene";
}
                               Response 5066
                               {
                               ResultCode=0;
                               ResultText="Message Queued";
                               };
                               Event PagerResponse
                               {
                               Timestamp="07082004130553EST";
                               MessageID="2004";
                               CadEventID="#CTYF041820772";
                               PagerID="229030020";
                               PagerName="Doe, John";
                               MessageRead=1;
                               }
```

1.2 Attribute Value Types

The SDP of the present invention preferably supports two attribute types, with string or integer values. Integer values are simply unsigned integers with no more than 32 significant bits, described using base-10 notation. Strings are simply printable ASCII strings contained in double quotes, and supporting the following escape sequences:

| | |
|---|---|
| \n | New Line |
| \r | Carriage Return |
| \" | Double Quote |
| \\ | Backslash |
| \### | An octal value |

1.3 The Timestamp Attribute

All events contain a timestamp attribute marking the creation of the event. A timestamp value contains a string in a specific format:

MMDDYYYYHHMMSST

Where

MM is the 2-digit month (1-12)

DD is the 2-digit day of the month (1-31)

YYYY is the 4-digit year

HH is the 2 digit hour (0-23)

MM is the 2 digit minute (0-59)

SS is the 2 digit second (0-59)

T is the 1-4 character time zone abbreviation

1.4 Attribute Order

In some cases, attribute order is significant. For illustrative purposes, receiving nodes are expected to read and decode attributes from first to last in the PDU.

2. Transactions

A transaction is exchanged on the network as a request from the client, some action by the server, and a response from the server. The SDP preferably includes three transactions described below:

Login

SendMessage

QueryMessage

2.1 Login

The Login transaction establishes the identity of the CAD client 20 or 20' for purposes of reconnection. Should a TCP/IP connection be terminated, the SPARKGAP™ sever 12' will queue events awaiting a reconnection.

2.1.1 Request

The request PDU contains the following attributes:

User (string, mandatory): This value contains the name or identity of the CAD system client 20 or 20', which preferably must match an entry in a SPARKGAP™ CAD account database in the database 18.

Password (string, optional): This value contains the access password for the CAD system client 20 or 20'. If the CAD account is set up without a password, then this attribute is not required.

Version (integer, mandatory): This value specifies the protocol version that the CAD system client 20 or 20' is requesting for this session. The version is conveyed as the major number multiplied by 100 and added to the minor number. For illustrative purposes, this attribute value is 100.

2.1.2 Response

The response PDU contains the following attributes:

ResultCode (integer, mandatory): This value contains the result code of the transaction.

ResultText (string, optional): This value contains a human readable message string describing the result of the transaction.

Version (integer, mandatory): This value specifies the protocol version that the SPARKGAP™ sever 12' is supporting for this session. The version is conveyed as the major number multiplied by 100 and added to the minor number. For illustrative purposes, this attribute value is 100.

System (string, optional): This value contains an identifying description of the SPARKGAP™-based system 10'.

2.1.3 Example

This example illustrates a CAD system client 20 or 20' logging into a SPARKGAP™ server 12' as user "ECD911," requesting version 1.0 of the protocol. The SPARKGAP™ server 12' grants the login and acknowledges version 1.0 support.

| CAD to SPARKGAP ™ | SPARKGAP ™ to CAD |
|---|---|
| request 5066 login<br>{<br>User="ECD911";<br>Password="GHTy778";<br>Version=100;<br>} | |
| | Response 5066<br>{<br>ResultCode=0;<br>Version=100;<br>ResultText="Connection Complete";<br>System="Sparkgap ESN 04000022";<br>} |

2.2 SendMessage

The SendMessage transaction queues a message for delivery for one or more pager recipients 16. The transaction only queues the message for processing. As the message is processed and responses are received, a sequence of events will convey the results back to the CAD system 10'.

2.2.1 Request

The request PDU contains the following attributes

MessageID (string, mandatory): This value uniquely identifies the message from the client (CAD) 20 or 20' perspective. An identical MessageID attribute will be included in all subsequent events related to this message.

CadEventID (string, optional): This value uniquely identifies the precipitating CAD event. If present, an identical CadEventID attribute will be included in all subsequent events related to this message.

DestinationID (string, mandatory): This value specifies the target audience for the message. The DestinationID corresponds to the name of a group of pagers or an individual pager in the SPARKGAP™ database. The PDU may contain multiple DestinationID attributes, in which case the message will be directed to an aggregated group representing the net total of all recipients.

GroupDetail (integer, optional): This value conveys the client's desire to receive detailed information about group recipients in the transaction response. If this field is present and set to a non-zero value, then the response will include a PagerID and PagerName attribute for each constituent number of the group. If the GroupDetail attribute is not present or set to zero, then this information will not be included in the response.

Display (string, mandatory): This value contains the actual display message to be read by message recipients. Multiple Display attributes are arranged in the order they appear into a single unbroken message.

AlertResponse (integer, mandatory): If present and set to a non-zero value, this value instructs the SPARKGAP™ server 12' to notify the CAD client 20' as pagers 16 receive the message and alert their users.

ReadResponse (integer, optional): If present and set to a non-zero value, this value instructs the SPARKGAP™ server 12' to notify the CAD client 20' as users display the message on their pager.

MCR (string, optional): If present, MCR attributes specify "multiple-choice responses" to be presented to the user as reply options. Multiple MCR attributes may be included in the request. The first MCR encountered is number 0, the second is number 1, and so on. As users reply to the message, the SPARKGAP™ server 12' will relay appropriate PagerReply events to the CAD client 20'.

2.2.2 Response

The response PDU contains the following attributes:

ResultCode (Integer, mandatory): This value contains the result code of the transaction.

ResultText (string, optional): This value contains a human readable message string describing the result of the transaction.

GroupSize: This value specifies the total number or recipient members in the group.

PagerID (String, mandatory): This value contains the identification of one pager in the aggregate destination group. The presence of this attribute signifies that a corresponding PagerName attribute will follow. Together, these two fields are duplicated for each member of the total pager destination group.

PagerName (string, optional): The value contains the name of the pager user corresponding to the last PagerID value.

2.2.3 Example

This example illustrates a CAD system or client 20' sending the message "Calling all cars" to two dispatch groups, Fire1 and Fire34. The CAD system client 20 requests notification from each pager 16 when the users read the messages, but not when the pagers alert. The request includes a CadEventID and a MessageID so that the CAD system can properly categorize forthcoming events related to this message. The SPARKGAP™ server 12' queues the message and returns a successful result code in the response.

| CAD to SPARKGAP ™ | SPARKGAP ™ to CAD |
|---|---|
| request 5066 sendmessage<br>{<br>CadEventID="#CTYF041820772";<br>MessageID="2004";<br>DestinationID="Fire1";<br>DestinationID="Fire34";<br>GroupDetail=1;<br>Display="Calling All Cars";<br>AlertResponse=0;<br>ReadResponse=1;<br>MCR="On My Way";<br>MCR="Busy";<br>MCR="Already On Scene";<br>} | |
| | Response 5066<br>{<br>ResultCode=0;<br>ResultText="Message Queued";<br>GroupSize=892;<br>} |

2.3 QueryMessage

The CAD client 20' initiates a QueryMessage transaction to discover present status of a previously sent message. The transaction response provides details about the message status as well as the status of all message recipients.

2.3.1 Request

MessageID (string, mandatory): This value identifies the message to be queried. It preferably must match the MessageID attribute of the SendMessage request that created the message.

2.3.2 Response

The response includes a message status, and a number of member status values in the form of an attribute group, PagerID, PagerName, PagerStatus. These three attributes may appear multiple times in the response to convey the status of multiple pagers in the message's aggregate destination group.

ResultCode (integer, mandatory): This value contains the result code of the transaction. If this value is not zero, then the MessageStatus, PagerID, PagerName, and PagerStatus fields will not be present.

ResultText (string, optional): This value contains a human readable message string describing the result of the transaction.

MessageStatus (integer, mandatory): This value contains the present status of the message, as described in the table below.

PagerID (string, mandatory): This value contains the identification of one pager in the aggregate destination group. The presence of this attribute represents that a corresponding PagerName attribute may follow, and that a PagerStatus attribute will follow. Together, these two or three fields are duplicated for each member of the pager group total pager destination group.

PagerName (string, optional): This value contains the name of the pager user corresponding to the last PagerID value.

PagerStatus (string, mandatory): This value contains the status of the pager user corresponding to the most recent PagerID value in the PDU. PagerStatus values are enumerated in the table below.

PagerStatus and MessageStatus value enumerations are described below:

| PagerStatus Values | |
|---|---|
| Value | Description |
| "Pending" | The message is pending for transmission. |
| "Sent" | The message has been sent to the device but not yet acknowledged in any way. |
| "Received" | The message has been successfully received by the device. |
| "Read" | The message has been read by the user. |
| "Answered" | The user has answered the message |

| MessageStatus Values | |
|---|---|
| Meaning | Description |
| "Pending" | The message is pending for transmission. |
| "Sent" | The message has been transmitted and is open for replies. |
| "Closed" | The message is closed. |

2.3.3 Example

This example illustrates a CAD system client 20', querying for the message 2004. The SPARKGAP™ server 12' returns a MessageStatus of "Sent" to indicate that the message has been sent, and it returns individual deliver status codes on the four members of the group.

| CAD to SPARKGAP ™ | SPARKGAP ™ to CAD |
|---|---|
| request 5067 sendmessage<br>{<br>MessageID="2004";<br>} | |
| | Response 5067<br>{<br>Result=0; |
| | MessageStatus="Sent";<br>PagerID="229030020";<br>PagerName="Doe, John";<br>PagerStatus="Read";<br>PagerID="229030109";<br>PagerName="Doe, Jane;<br>PagerStatus="Sent";<br>PagerID="229030043"<br>PagerName="Orwell, George";<br>PagerStatus="Read";<br>PagerID="229030025";<br>PagerName="Miller, Mark";<br>PagerStatus="Answered";<br>} |

3 Events

SDP allows the SPARKGAP™ server 12' to send asynchronous events to the CAD system client 20' to notify it of message activity on the network. SDP includes two events:

PagerReply

MessageComplete 3.1 PagerReply

This event informs the CAD system client 20' that a recipient pager 16 has responded in some way to a message. The event contains the following attributes Timestamp (string, mandatory): This value specifies the time that the SPARKGAP™ server 12' received the information from the pager.

MessageID (string, mandatory): This value identifies the message, matching the MessageID attribute value of the SendMessage request that created the message.

CadEventID (string, mandatory): This field is preferably only present if a CadEventID attribute existed in the SendMessage request that created the message. If it is present, it matches the value in the SendMessage request.

PagerID (string, mandatory): This value contains the identification of the pager issuing the reply.

PagerName (string, optional): This value contains a descriptive name of the pager user.

UserAlerted (integer, optional): If this attribute is present and its value is non-zero, it means that the message was successfully received by the pager 16 and the user was alerted.

MessageRead (integer, optional): If this attribute is present, it means that the user displayed the message on the pager 16.

McrValue (integer, optional): If this attribute is present, the user selected a multiple-choice reply value indicated by the value.

McrText (string, optional): If this attribute is present, it contains the actual text of the selected multiple-choice reply.

MessageText (string, optional): If this attribute is present, it contains a manually typed response from the pager.

The PDU preferably will not aggregate events, but rather it will contain either UserAlerted, MessageRead, McrValue (and McrText), or MessageText. It preferably will not contain a combination of these fields. Each distinct pager response will arrive in its own event PDU with its own timestamp value.

In the following example, Pager 229030020 (John Doe) has responded to message 2004 with multiple-choice response number 2.

| CAD to SPARKGAP ™ | SPARKGAP ™ to CAD |
|---|---|
| | Event PagerResponse<br>{<br>Timestamp="07082004130553EST";<br>MessageID="2004";<br>CadEventID="#CTYF041820772";<br>PagerID="229030020";<br>PagerName="Doe, John";<br>UserAlerted=1;<br>MessageRead=1;<br>McrValue=2;<br>McrText="Already On Scene";<br>} |

3.2 MessageComplete

This event informs the CAD system client 20' that a message has transitioned to the closed state. The message record will remain in memory 18 for some time, but the system will no longer accept pager responses for it. This event contains the following attributes:

Timestamp (string, mandatory): This value specifies the time that the SPARKGAP™ closed the message.

MessageID (string, mandatory): This value identifies the message, matching the MessageID attribute of the SendMessage request that created the message.

CadEventID (string, mandatory): This value is only present if a CadEventID attribute existed in the original SendMessage request that created the message, and if it is present, it matches the value in the SendMessage request.

In this example, SPARKGAP™ announces that Message 2004 is closed:

| CAD to SPARKGAP ™ | SPARKGAP ™ to CAD |
|---|---|
| | Event MessageComplete<br>{<br>Timestamp="07082004130553EST";<br>MessageID="2004";<br>CadEventID="#CTYF041820772";<br>} |

Result Codes
SDP supports the following result codes:

| | |
|---|---|
| 0 | Transaction Completed Successfully |
| 1000 | Badly formed PDU |
| 1001 | Unknown recognized Request |
| 2000 | Invalid User/Password |
| 3000 | Message Queue Full - Try Again Later |
| 3001 | Unknown MessageID |
| 3002 | Unknown DestinationID |
| 3003 | Missing Required Attribute |

Server or Switch 12/Mobile Receiver 16 Protocol

A Dispatch/Response Layer will now be described which is a layer above the ReFLEX™ Air Protocol that supports group messaging between a client 20 or 20' and a mobile device 16 in accordance with the present invention. The SDP and DRL are analogized as book ends in that they operate on either side of a ReFLEX network 14'.

1. Introduction

The present invention preferably provides for acknowledged group messaging support for the ReFLEX™ protocol. The ReFLEX™ protocol supports personal and information service (IS) messages. Personal messages involve a single recipient, and ReFLEX™ enables the receiving pager to acknowledge reception, notify that the user has read the message, and relay multiple-choice responses from the user. IS messages involve an arbitrary group of recipients sharing common group addresses called an IS addresses. ReFLEX pagers can be configured with one personal address and multiple IS addresses. IS messages are strictly one-way, and ReFLEX™ does not support any response or acknowledgement from the recipient group.

The present invention adds message acknowledgement, message read notification, and multiple-choice response capability to IS messages, creating an infrastructure for reliable multicast messaging within the ReFLEX™ protocol. To this end, the present invention defines a new ALOHA command (Multicast ACK Command), and defines a flag in the 'Change Registration Command' to select which devices are allowed to use this feature.

The Dispatch/Response Layer (DRL) provides efficient and high-performance group and personal messaging over a ReFLEX™ network 14' between the server 12' and the user devices or receivers 16. DRL uses binary IS vectors and multicast ACK commands to deliver dispatch messages to groups of users and receive individual responses. It also provides a simple structure for personal messaging between individuals, and it is designed to operate over the Secure Paging Layer (SPL). SPL is an obvious, open-source encryption standard based on AES. This system 10 or 10', however, can be implemented with other encryption methods.

2. Overview

DRL supports both group and personal messages.

2.1 Group Messages

Group Messages are broadcast to a group of one or more pagers 16 using ReFLEX™ IS addresses. A Group Message includes a specially-formatted ReFLEX™ binary message broadcast by the network 14' to a group of pagers 16, and a number of ReFLEX™ Multicast ACK Command responses from the pagers 16 back to the network 14'. This type of message can contain a display message a supervisory command, or both.

2.2 Personal Message

Personal messages are sent between a single pager 16 and the network 14' using a ReFLEX™ personal address. A Personal Message includes a specially-formatted ReFLEX™ binary message sent from the network to a pager, or a ReFLEX™ long inbound message from the pager to the network. Additionally, pagers may transmit ReFLEX™ ACK Responses, Multiple-Choice Commands, and Transaction Control Commands in response to forward messages.

The present invention provides for acknowledged group messaging support for ReFLEX™ protocol. The Multicast ACK command is a new ALOHA command used by a pager 16 to reply to an IS message. This command's MSN refers not to the device personal address, but instead to an IS address selected from the device codeplug with a 4-bit enumeration field. The 30-bit IS address itself is synchronized between the pager 16 and its home switch or server 12', using means similar to those provided by the open ReFLEX Exchange Protocol (RXP) and the Motorola Generic Over-The-Air Programming Protocol (GOTAP).

The 'Multicast ACK Command' contains a message sequence number (MSN), a 4-bit IS address identifier (ai) and a 7-bit reply identifier (mr). The IS address identifier specifies the IS address programmed into the pager, and MSN identifies the message being replied to, and the reply identified indicates the enumerated reply code.

The Multicast ACK Command reply identifier can specify responses pre-programmed in the pager (codes 0 through 63), responses embedded in the group message (codes 64 through 111), or supervisory messages, as follows:

---
124 Message received by pager
125 Message received by pager and read by user
126 Message received but could not be decoded
127 Message received with transmission errors
---

The network 14' responds to the 'MulticastACK Command' with a 'Standard ACK' (Motorola ReFLEX 2.7.3 Specification, Section 3.10.9.2). In order to control where this feature is available (and which devices may use it,), bit d4 of the 'Registration Grant' type 'Change Registration Command' (3.1 0.8.1) is redefined from 'reserved' to RM. An RM value of zero restricts the pager from transmitting the 'MulticastACK Command'. An RM value of one enables the pager to transmit the 'MulticastACK Command.'

On a per-message basis, the RE and RD bits (alphanumeric and binary vectors, respectively) determine whether the Multicast ACK Command may be transmitted for any particular IS message. If RE is 1 (or RD=0), and RM=1 during the last 'Registration Grant' seen by a device 16, then it may transmit 'Multicast ACK Command' packets related to the message. Application protocols (such as Motorola FLEXSuite, and higher-level protocols) will determine which specific 'Multicast ACK Command' are appropriate for the message.

2.3 Device 16 Capabilities And Behavior 2.3.1 Multicast ACK Command

DRL uses ReFLEX™ IS addresses for personal messaging. Compliant DRL Devices 16 preferably support the Multicast ACK Command described above, and they support an additional non-volatile configuration bit for each IS address in their codeplug. This flag is called the 'CC' or "carbon copy" flag, and it serves to disable Multicast ACK Command responses on the specified IS address. The device 16 preferably supports at least 16 IS addresses and 16 CC bits, which are automatically synchronized over the air using GOTAP or similar means.

2.3.2 Performance

DRL is designed to support public safety, law enforcement, and other applications where timely delivery of personal and group messages is paramount. DRL devices 16 preferably support ReFLEX™ protocol version 2.7.3 reduced latency operation, in which they will examine each frame for IS or personal messages.

2.3.3 User Interface

DRL messages follow the 'e-mail' model and can include a from-address, a to-address, a subject and a message body. DRL devices 16 include one or more IS addresses configured for DRL group messaging, including a CC flag (set through GOTAP) and a group name (such as 'Ladder46', 'Hazmat', or 'BerkelyEMS$^T$') maintained through DRL. Users can select alert options per IS address, using the symbolic name of the address to assist the user in organizing his in-box. Personal messages and group messages can appear in the same mailbox; group addresses preferably display the name of the group as the from address.

3. Message Structure

DRL preferably uses ReFLEX™ long binary messages adhering to the Motorola Route to Alternate Host (RAH) protocol as described in the Motorola FlexSuite™ of Enabling Protocols Specification Document. Preferably all DRL messages include a Message Header followed by Message Content.

3.1 Message Header

Headers can include the RAH SIF (0x11) and RAH Address ID (0x2d), followed by a DRL message type, as follows

| DRL Message Header | | |
|---|---|---|
| Field Name | Byte Length | Description |
| SIF | 1 | RAH SIF (0x11) |
| Address ID | 1 | RAH Address ID (0x2d) |
| Type | 1 | DRL Message Type |

3.2 Message Content

Content type is identified by the Type field, as follows:

| Type | Description |
|---|---|
| 0 | Ignore Message |
| 1 | Group Message |
| 2 | Personal Forward Message |
| 3 | Personal Reverse Message |
| 4 | Personal Response Message |
| 5-255 | Reserved |

The message content consists of a sequence of octets following immediately after the Type field of the long message header.

4. Group Message

A Group Message preferably consists of a one-to-many broadcast message with recipient confirmation and reply options. Group alerts are transmitted as ReFLEX™ 1-Way binary IS messages with a DRL Type code of 1.

4.1 Forward Message

The group dispatch message initiates the group dispatch transaction, conveying a display message to a number of pagers. It is a DRL long message transmitted using a ReFLEX™ 1-way personal or IS address, and it contains a 1-byte Control field, and a Display field consisting of a number of null-terminated strings encoded according to the PACK7 format described in Appendix D of the Motorola FlexSuite™ of Enabling Protocols Specification Document.

| Dispatch Message Content | | |
|---|---|---|
| Field Name | Byte Length | Description |
| Control | 1 | Control Flags |
| Opcode | 1 | Execution opcode |
| Operand | Variable | Execution operand |
| Display | Variable | NULL-Terminated Display String List. |

The Control field specifies how the pager 16 should respond. Opcode and Operand fields specify auxiliary action the device 16 should take in addition to or instead of displaying the message, and the Display field contains the actual display message.

4.1.1 Control Field

The Control field provides guidance on how the pager 16 should respond to the message:

| Control Flag Definitions | | |
|---|---|---|
| Bit | Name | Description |
| 0 | AckReceipt | Acknowledge receipt of the message |
| 1 | AckRead | Acknowledge reading of the message |
| 2 | UseMcr | Provide the user a multiple choice response |
| 3-7 | Reserved | Reserved flags (set to zero) |

An AckReceipt value of 1 instructs the pager 16 to generate a ReFLEX™ Multicast ACK when the message is received, and an AckRead value of 1 instructs the pager to generate a Multicast ACK when the message is read by the user. A UseMCR value of 1 instructs the pager provide a multiple-choice response list to the user, including responses programmed into the pager as well as responses embedded into the message itself.

4.1.2 Operand/Opcode Field

Opcode and Operand fields specify auxiliary action the device 16 should take in addition to (or instead of) displaying the message. The Opcode field is a one byte value divided into upper and lower 4-bit fields. The upper 4 bits specifies the octet length of Operand, and the lower 4 bits specifies the action to be taken. The lower 4 bits use the following enumerations:

| Operand Values | | |
|---|---|---|
| Opcode | Operation | Description |
| 0 | No Operation | Take no action |
| 1 | Assign Name | Assign Group Name to Address |
| 2 | Execute | Execute Alerting Sequence |
| 3-15 | Reserved | Reserved |

4.1.2.1 Opcode '0'—No Operation

This opcode specifies no operation and should be ignored.

4.1.2.2 Opcode '1'—Assign Group Name To Address

This opcode instructs the receiver 16 to assign a symbolic group name to the IS address, which are contained as one character per byte in the next 0-15 bytes. An operand length of zero implies 'no name,' while a length of 1-15 bytes indicate a 1-15 character long name.

4.1.2.3 Opcode '2'—Execute Alerting Sequence

This opcode instructs the receiver to execute a pre-programmed, external alerting sequence, such as a generating a public address tone, closing a relay contact or performing a sequence of relay closures, or printing the message. The first operand byte specifies the sequence to execute, which defaults to zero if no operand data is present. Operand data bytes 1-15, if present, contain additional parameters specific to the sequence. Devices that do not support this feature should ignore this opcode.

4.1.3 Display Field

The Display field is one continuous Pack7 field containing a list of null-terminated strings. These strings include, in order, the message subject, the message body, and up to 16 optional multiple-choice response strings. The subject and body are displayed to the user, and the response strings are presented as a list.

4.2 Multicast ACK Command Response

Under certain circumstances, the device may respond to the message with one or more Multicast ACK Commands. This behavior depends on 4 factors:
 values of the RD bit in the message vector,
 the Control field of the message,
 the RM value of the last 'Registration Grant' seen by a device, and
 the Multicast Ack Enabled flag of the IS address used If RD=1 and RM=0, or Multicast Ack Enabled=0 then this command must not be used. Otherwise, the command should be sent under the following circumstances:

Upon Message Receipt
  If AckReceipt of the Control field is 1, then the device 16 queues a Multicast ACK Command with mr=124 into its transmit queue when it receives a complete, error-free message.
 Upon the User Viewing the Message
  If AckRead of the Control field is 1, then the device 16 queues a Multicast ACK Command with mr=125 into its transmit queue when it receives a complete, error-free message.
 Upon the User Selecting a Reply
  If UseMcr of the Control field is 1, then the device 16 gives the user the option to select a reply string from an aggregated list including the replies programmed into the device and the replies embedded in the Display field. If the user selects a string, then the device 16 queues a Multicast ACK Command with mr=[0, 111] into its transmit queue. Codes 0-63 are reserved for responses programmed in the pager, and codes 64-111 are reserved for any response strings in the Display field. The user may respond to the message multiple times.

Subsequent Multicast ACK Commands associated with the same message can be optimized, and some of them can be overlooked without loss of information. For instance, an mr of 125 or an mr in the [0, 111] range implies that the message has been received and viewed. Depending on how fast the user reads and/or responds to a message, and depending on the ALOHA randomization interval of the system, the pager 16 may be able to skip transmission of Multicast ACK Response commands with mr values of 124 and 125 and simply transmit the multiple-choice reply code [0, 111]. When possible, this is desirable in order to reduce congestion of the return channel.

5. Personal Message

A Personal Message is a human-readable message carried from one point to another. Personal Forward Messages are sent by the network 14' to one pager 16, and Personal Reverse Messages are sent by the pager 16 to the network 14'. The DRL model for Personal Messages is similar to an abbreviated version of SMTP.

5.1 Personal Forward Message

A Personal Forward Message is transmitted by the network 14' to the pager 16. It contains Display field consisting of a number of null-terminated strings in FlexSuite Pack7 format.

This message type can be delivered as a one-way or two-way long binary message to single pager 16, with acknowledgement, read response, and multiple-choice replies transmitted back using the ReFLEX™ signaling layer. Display contains an ordered list of strings: a from-address, a subject, a body, and an optional list of multiple-choice replies.

5.2 Personal Reverse Message

A Personal Reverse Message is transmitted by the pager 16 to the network 14'. It contains Display field consisting of a number of null-terminated strings in FlexSuite Pack7 format.

This message is delivered as a ReFLEX™ long inbound binary message. Display contains an ordered list of strings: a to-address, a subject, and a body.

Exemplary Tactical Alerting System

ReFLEX pagers are not fixed on a single channel for service, but rather scan continuously for a better, stronger, or more appropriate signal to serve them. This background scanning facilitates the present invention since it is this ability that allows these devices to seek out the correct channel for temporary use at the scene of an event.

Figure 9A:
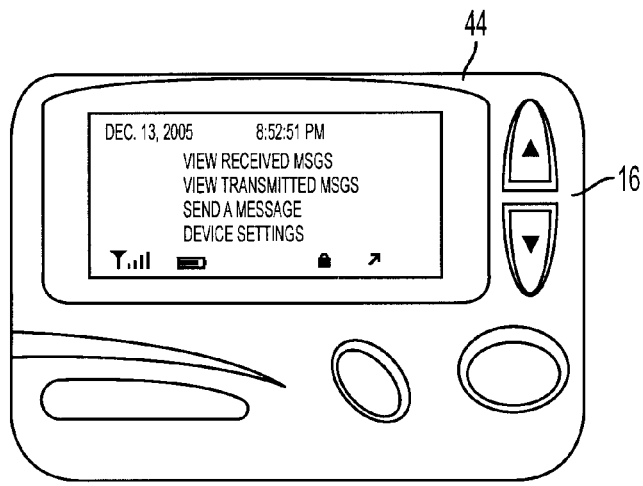
FIGS. 9A, 9B and 10 are views of mobile receivers constructed in accordance with exemplary embodiments of the present invention.
Figure 9B:
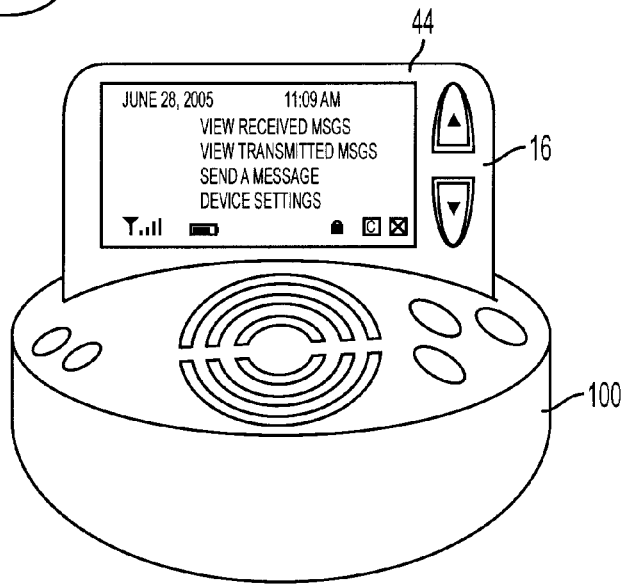
Figure 10:
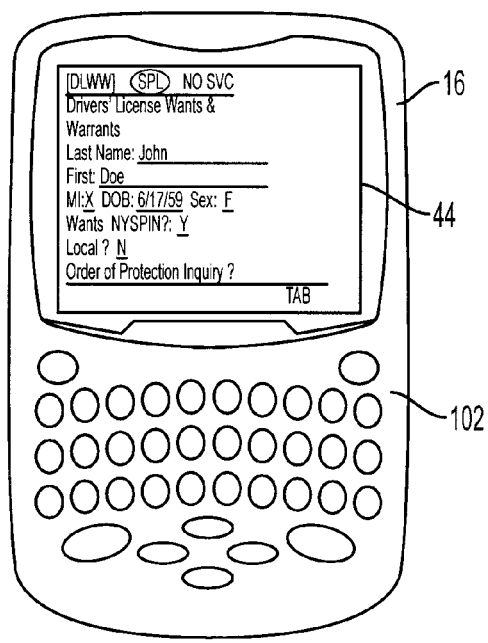

In accordance with an exemplary embodiment of the present invention, a pager 16 is provided as shown in FIGS. 6, 9A, 9B and 10. With reference to FIG. 6, the pager 16 comprises a processor 38 programmed to implement the DRL, among other operations, a memory 36 for storing, for example, group configuration information, a display 44 and an interface 40 to the network 14. The pager 16 can be connected directly to a user interface 42 for facilitating customization of the group configuration information, for example, to allow the pager 16 to respond differently to messages directed to different group addresses. As shown in FIGS. 9A and 9B, the pager 16 has a display for displaying different screens and different options thereon. For example, the main screen shown on the display 44 in FIG. 9A indicates time and date and a menu listing such options as "VIEW RECEIVED MSGS", "VIEW TRANSMITTED MSGS", "SEND A MESSAGE" and "SERVICE SETTINGS". As shown in FIG. 9B, the pager 16 can be provided with a charger console 100 which can also have an input to the user interface 42. As shown in FIG. 10, the pager 16 can be provided with a QWERTY keypad 102, among other buttons and controls.

The pager 16 can be used by responding personnel on a day-to-day basis as a wide-area alerting device, but also as a tactical alerting device at the scene of an incident. The pager preferably operates on any programmed ReFLEX™2.7.x network. If an on-scene SPARKGAP™ (for instance, mounted into a mobile communications center) is operating with its own base station and an RXP connection to the wide area system, the pager 16 can register with the on-scene SPARKGAP™ when the responder arrives. When the pager 16 arrives at the site of an event with an established on-scene network such as the switch 12' (e.g., the SPARKGAP™ server), the pager 16 automatically finds this system 10, switches to the proper channel, and registers. As long as that pager 16 is in the coverage area of the on-scene SPARKGAP™ server 12', it will be a part of the community of pagers 16 receiving messages from the command post for that particular occurrence. Once the on-scene network is shutdown, or the responder leaves the coverage area, the pager 16 will re-register on the wide-area system.

The on-scene SPARKGAP™, and pagers, can be preloaded with one or more IS addresses reserved for tactical alerting. Incident commanders can send messages to these IS addresses to notify users on-scene of impending tactical issues, such as imminent structural failure or impending chemical release. In addition to the ability to automatically find the channel being used at the scene of a major event, the pager 16 is also equipped with louder than normal (>85 dB at 30 cm) alerting tone and strong vibrator to ensure the user is aware of an incoming message. With appropriate configuration, tactical alert messages can be sent to specific groups of user, or to all users on scene. Additionally, AES encryption is available to prevent inappropriate interception of tactical alerts.

Because the on-scene system is connected by RXP to the wide-area network, pagers also continue to send and receive normal personal and group messages from the wide area system. However, the pager can be configured with unique alert tones to allow personnel to recognize incoming tactical messages, and the on-scene SPARKGAP can even temporarily configure local devices so that they only alert the user when tactical messages are received.

Modern wide-area paging networks utilize the 900 MHz band of radio spectrum. Some of these channels are dedicated to the NPCS Radio Service (FCC Part 24) and others are found in Business and Industrial Radio Service (FCC Part 90) making them available to a wide range of system operators. The pager 16 uses frequencies in either or both of these channel segments based on programming within the paging device itself.

When a major public safety event occurs, it is normal for the involved agencies to establish a command post at or near the scene of the event. Many times this is a motor home-style vehicle equipped to resemble a control room with banks of computers, radios and a meeting area used for staff briefings. As a critical part of this command post, a SPARKGAP™ server 12' can be installed to control the ReFLEX™ paging devices 16 carried to the scene by various responders. Once this system 10' (FIG. 4) is activated, pagers 16 that are preprogrammed with the on-scene channels would lock onto the network at the scene and check in. A display of all registered paging devices could be used to monitor the presence of personnel as they arrive.

If it was necessary to call a general evacuation of the scene, this message would be sent via the server 12' and each device 16 would acknowledge receipt and reading of the message. Paging allows the message to be sent to multiple users at the same time. The site command personnel would have an instant view of those who did not respond to the alert and could take immediate alternative action to get the message to them.

In this way, paging is analogous to an electronic equivalent of a lifeline attached to each person at the scene. Notifying them to evacuate by sending an alert message would be like pulling on that line and getting a tug as a response. The structure of a paging network provides the highest efficiency when it comes to alerting multiple users to an important message. And more importantly, the system 10 or 10' of the present invention gives the incident commander a confirmed indication that the message was received and read by the personnel to whom it was sent.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of alerting a group of recipients over a wireless network and providing acknowledged group messaging, each recipient comprising at least one mobile device capable of transmitting and receiving data, the method comprising the steps of:

storing data relating to recipients, groups and group members, in a memory device, the data comprising a recipient identifier for each of a plurality of recipients, one or more group identifiers corresponding to each of respective groups of recipients, the groups each comprising selected ones of the plurality of recipients, and group membership data comprising the recipient identifiers of the selected recipients corresponding to each of the group identifiers;

providing the mobile device corresponding to each of the plurality of recipients with at least a subset of the data stored in the memory device, the subset of the data being stored in the mobile device and comprising its corresponding recipient identifier and the group identifier of each group to which that recipient belongs as a group member;

wirelessly transmitting a group message to the mobile device corresponding to each recipient in a selected group of recipients, each of the mobile devices being configured to receive the group message and send a response when the group message is determined to be for a group to which that recipient belongs as a group member;

monitoring for responses to the group message from the group members; and storing acknowledgement data in the memory device for each of the group members, the acknowledgement data comprising a listing of each of the group members and an indication of response for each of the group members, the indication of response comprising at least one of an indication of no response when that group member has not yet responded to the group message, and an indication of response when a response sent by the mobile device of that group member has been received.

2. A method as claimed in claim 1, wherein the group message is sent using at least one of paging communications, cellular communications, two-way radio communications, wireless local-area network employing IEEE 802.11 standard for "Wi Fi", wireless metropolitan-area network employing IEEE 802.16 standard for "WiMAX", wireless area network employing IEEE 802 standard communications, wireless broadband network, and wireless network.

3. A method as claimed in claim 1, wherein the responses are sent using at least one of paging communications, cellular communications, two-way radio communications, wireless local-area network employing IEEE 802.11 standard for "Wi Fi", wireless metropolitan-area network employing IEEE 802.16 standard for "WiMAX", wireless area network employing IEEE 802 standard communications, wireless broadband network, and wireless network.

4. A method as claimed in claim 1, wherein the group message has a message identifier and the responses comprise the message identifier to facilitate associating responses to corresponding group message.

5. A method as claimed in claim 1, wherein the response comprises at least one of message received indicator, message read indicator, a reply selected from among multiple choice options, and an alphanumeric text reply entered by the recipient via the mobile device.

6. A method as claimed in claim 1, further comprising:
updating at least one of the recipient identifier, the group identifier and the group membership data stored in the memory device whenever a recipient, group or group member is added or deleted; and
updating data stored in a mobile device based on the data stored in the memory device.

7. A method as claimed in claim 1, wherein the transmitting of the group message is performed via a dispatch center, and the monitoring is performed via a network device.

8. A deterministic group messaging system providing acknowledged group messaging comprising:

a memory device configured to store
a recipient identifier for each of a plurality of recipients,
a group identifier corresponding to each of respective groups of recipients, the groups each comprising selected ones of the plurality of recipients, and
group membership data comprising the recipient identifiers of the selected recipient corresponding to each of the group identifiers,
wherein at least one mobile device corresponding to each of the plurality of recipients is provided with at least a subset of the data stored in the memory device, the subset of data being stored in the mobile device and comprising its corresponding recipient identifier and the group identifier of each group to which that recipient belongs as a group member; and a control module comprising at least one processing device that is configured to access the memory device and is programmed to
wirelessly transmit a group message corresponding to one of the groups of recipients, each of the mobile devices being configured to receive the group message and send a response when the group message is determined to be for a group to which that recipient belongs as a group member,
monitor for responses to the group message, and
store acknowledgement data in the memory device for each of the group members, the acknowledgement data comprising a listing of each of the group members and an indication of response for each of the group members, the indication of response comprising at least one of an indication of no response when that group member has not yet responded to the group message, and an indication of response when a response sent by the recipient device of that group member has been received.

9. A system as claimed in claim 8, wherein the group message is sent using at least one of paging communications, cellular communications, two-way radio communications, wireless local-area network employing IEEE 802.11 standard for "Wi Fi", wireless metropolitan-area network employing IEEE 802.16 standard for "WiMAX", wireless area network employing IEEE 802 standard communications, wireless broadband network, and a wireless network.

10. A system as claimed in claim 8, wherein the group message has a message identifier and the responses comprise the message identifier to facilitate associating responses to corresponding group message.

11. A system as claimed in claim 8, wherein the control module is further configured to
update at least one of the recipient identifier, the group identifier and the group membership data stored in the memory device whenever a recipient, group or group member is added or deleted, and
update data stored in a mobile device based on the data stored in the memory device.

12. A system as claimed in claim 11, wherein the control module is configured to update data stored in a mobile device with the data stored in the memory device using wireless communication to the recipient devices.

13. A method as claimed in claim 8, wherein the at least one processing device comprises a processing device at a dispatch center to transmit the group message, and a processing device at a network device to monitor the responses.

* * * * *